(12) United States Patent
Chen et al.

(10) Patent No.: US 8,537,329 B2
(45) Date of Patent: Sep. 17, 2013

(54) RESCUE CIRCUIT OF DISPLAY PANEL AND RESCUE METHOD THEREOF

(75) Inventors: Chenghung Chen, Shenzhen (CN); Chengming He, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 98 days.

(21) Appl. No.: 13/216,741

(22) Filed: Aug. 24, 2011

(65) Prior Publication Data

US 2012/0147311 A1    Jun. 14, 2012

(30) Foreign Application Priority Data

Dec. 10, 2010    (CN) .......................... 2010 1 0583534

(51) Int. Cl.
| | |
|---|---|
| G02F 1/13 | (2006.01) |
| G02F 1/1333 | (2006.01) |
| G02F 1/1343 | (2006.01) |
| G02F 1/1345 | (2006.01) |
| G09G 3/36 | (2006.01) |

(52) U.S. Cl.
USPC ............... 349/192; 349/54; 349/55; 349/149; 345/93

(58) Field of Classification Search
USPC .................. 349/192, 54, 55, 149; 345/93, 98
See application file for complete search history.

(56) References Cited

U.S. PATENT DOCUMENTS

| | | | |
|---|---|---|---|
| 2006/0125754 A1 | 6/2006 | Rao et al. | |
| 2007/0139342 A1* | 6/2007 | Lin et al. | ........................ 345/98 |
| 2010/0188594 A1* | 7/2010 | Qian | ............................... 349/54 |

FOREIGN PATENT DOCUMENTS

| | | |
|---|---|---|
| CN | 100365494 C | 1/2008 |
| CN | 100410744 C | 8/2008 |
| CN | 101699551 A | 4/2010 |
| KR | 20070077680 A | 7/2007 |

\* cited by examiner

*Primary Examiner* — Bumsuk Won
*Assistant Examiner* — Kendrick Hsu
(74) *Attorney, Agent, or Firm* — Ditthavong Mori & Steiner, P.C.

(57) ABSTRACT

The present invention discloses a rescue circuit of display panel and a rescue method thereof. The rescue circuit includes an amplifier, a first conductive line, a second conductive line, and a third conductive line. The amplifier has an input end and an output end. The first conductive line and the second conductive line intersect and are isolated from signal input terminals of the plurality of signal lines. The first conductive line is electrically connected to the input end and the second conductive line is electrically connected through an electrical resistor to the output end. The third conductive line intersects and is isolated from signal distal ends of the signal lines and is electrically connected to the output end. The rescue method includes performing a welding operation and performing a cutting operation. With such a rescue, a broken signal line may effectively overcome the problem of weak line with the electrical resistor connected to the second conductive line.

3 Claims, 6 Drawing Sheets

RESCUE CIRCUIT OF DISPLAY PANEL AND RESCUE METHOD THEREOF

BACKGROUND OF THE INVENTION

1. Field of the Invention

The present invention generally relates to a rescue circuit of display panel and a rescue method thereof, and in particular to a rescue circuit of display panel and a rescue method thereof that improve resistive-capacitive (RC) delay occurring in a signal line.

2. The Related Arts

FIG. 1 is a schematic view illustrating a conventional way of rescuing a signal line of a liquid crystal display panel. As shown in FIG. 1, the liquid crystal display panel comprises a substrate 10, and a plurality of scan lines 12 and a plurality of signal lines 14 are provided on the substrate 10 with the plurality of scan lines 12 arranged to be parallel to each other and intersecting the plurality of signal lines 14. The scan lines 12 and the signal lines 14 form a plurality of pixel areas therebetween, each being controlled by a thin film transistor (TFT) (not shown) for pixel refreshing. Further, the substrate 10 comprises a scan chip 22 and a plurality of signal chips 24. For clear illustration, only one signal chip 24 is shown in the drawings. The scan chip 22 functions to sequentially drive the scan lines 12, and the signal chips 24 provides the display signal of a pixel to the signal lines 14.

Due to the increase of the number of pixels, the distance between two adjacent scan lines 12 or two adjacent signal lines 14 arranged on the substrate 10 is as small as several micrometers. Consequently, a signal line 14 may get broken and thus open in the manufacturing process due to a foreign object (such as dust). To handle the problem of breaking and thus opening of the signal lines 14, a conventional liquid crystal display panel is further provided with a rescue line 16 on the substrate 10 for repairing a broken signal line. The rescue line 16 is arranged in a peripheral area around a display zone 11 formed by the scan lines 12 and the signal lines 11 and is made intersecting but spaced from the plurality of signal lines 14 by an isolation layer. When it happens that one of the signal lines 14 is broken and thus gets open, the rescue line 16 may be used to recover the portion of the signal line 16 posterior to the opening site through application of laser welding to the intersections (black dot) thereof with the signal line 14. The display signal supplied from the signal chip 24 is transmitted through the rescue line 16, along route 162, to apply to the signal line 14.

Reference is made to FIGS. 1 and 2A. FIG. 2A is a plot of display signals at points A, B of FIG. 1, which are not subjected to correction. A comparison is made between points A, B that are located on the same horizontal line of FIG. 1. This is because a signal line 14 is broken and thus open at point A, and a display signal is transmitted through a rescue line 16, along route 162, to point A; however, the signal line 14 at point B is intact and is not broken, so that a signal may be transmitted along route 142 from the upper side to the lower side. With the increase of the panel size, the numbers of the scan lines 12 and the signal lines 14 are getting increased, making signal transmission along route 162 toward point A is much longer than transmission along route 142 to point B and a correspondingly enlarged resistive-capacitive delay (RC delay). As a consequence, distortion of the display signal at point A is severer than at point B. However, a significant difference of the display signals may lead to the situation that the charging ratio at point A is much smaller than that at point, thus causing a weak line phenomenon around point A.

Reference is made to FIGS. 1 and 2B. FIG. 2B is a plot of display signals of points A, B of FIG. 1 after correction, wherein the display signals at points A, B are respectively shown in phantom lines and solid lines. In the state of the art, a buffer amplifier 20 based circuit is often connected to the rescue line 16 in order to improve the RC delay problem of the signal line around point A, as shown in FIG. 2B. This also solves the weak line problem around point A.

However, as shown in FIGS. 1 and 3, wherein FIG. 3 is a plot of display signals at points C, D of FIG. 1, the display signals at points C, D are respectively shown in solid lines and phantom lines signal. A comparison is made between points C, D that are located at the same horizontal line of FIG. 1. Point C is located at the portion of the signal line 14 anterior to the opening site, while point D is located on a signal line 14 that is intact. Consequently, RC delay at point C is much smaller than that of point D. When the difference of display signals is significant, a weak line phenomenon may similarly occur around point C (due to being of significant difference from the signal line of point D).

SUMMARY OF THE INVENTION

In view of this, an objective of the present invention is to provide a rescue circuit of display panel to overcome the above problems.

Another objective of the present invention is to provide a rescue method for display panel by using a rescue circuit for recovering a broken and thus open signal line without causing weak line phenomenon in the recovered signal line.

To achieve the above objectives, the present invention provides a rescue circuit of display panel. The display panel comprises a plurality of signal lines, and each of the signal lines has a signal input terminal and a signal distal end. The rescue circuit comprises an amplifier, a first conductive line, a second conductive line, and a third conductive line. The amplifier has an input end and an output end. The first conductive line intersects and is isolated from the signal input terminals of the plurality of signal lines and is electrically connected to the input end. The second conductive line intersects and is isolated from the signal input terminals of the plurality of signal lines and is electrically connected through an electrical resistor to the output end. The third conductive line intersects and is isolated from the signal distal ends of the plurality of signal lines and is electrically connected to the output end.

In a preferred embodiment of the rescue circuit according to the present invention, the amplifier is a buffer amplifier. The amplifier and the electrical resistor are mounted on a printed circuit board. Further, the second conductive line is electrically connected to the third conductive line. It is noted that an isolation layer is provided between the first and second conductive lines and the plurality of signal lines, and a similar isolation layer is arranged between the third conductive line and the plurality of signal lines. It is noted that the first conductive line and the second conductive line are spaced from each other by a distance for facilitating cutting off the plurality of signal lines.

According to the rescue circuit of display panel of the present invention, the first conductive line and the third conductive line are connected to an amplifier to reduce the RC delay of a posterior portion of a broken signal line. Further, the second conductive line is connected to an electrical resistor to deteriorate the display signal transmitted to an anterior portion of a broken signal line in order to overcome the weak line problem discussed above.

Further, the present invention also discloses a rescue method for display panel by using a rescue circuit, wherein the display panel comprises a plurality of signal lines and each of the signal lines has a signal input terminal and a signal distal end. The rescue circuit comprises an amplifier, a first conductive line, a second conductive line, and a third conductive line. The amplifier has an input end and an output end. The first conductive line intersects and is isolated from the signal input terminals of the plurality of signal lines and is electrically connected to the input end. The second conductive line intersects and is isolated from the signal input terminals of the plurality of signal lines and is electrically connected through an electrical resistor to the output end. The third conductive line intersects and is isolated from the signal distal ends of the plurality of signal lines and is electrically connected to the output end.

The rescue method comprises: performing a welding operation to weld a broken one of the signal lines to the first conductive line, the second conductive line, and the third conductive line at corresponding intersections; and performing a cutting operation to cut off connection of the broken signal line between the intersections thereof with the first conductive line and the second conductive line. The welding operation is preferably performed with laser welding; and the cutting operation is preferably performed with laser cutting.

According the rescue method using rescue circuit of the present invention, the display signal of the broken signal line is transmitted through the first conductive line to the amplifier, passing through the third conductive line to reach the posterior portion of the broken signal line, whereby RC delay on the posterior portion of the broken signal line is alleviated. The display signal is also transmitted through the amplifier and the second conductive line to the anterior portion of the broken signal line, whereby the display signal is subjected to deterioration caused by the electrical resistor to make the anterior portion of the broken signal lines similar to the neighboring signal lines in order to overcome the weak line problem.

To make the present invention more clearly understood, a preferred embodiment will be described in detail hereinafter with reference to the attached drawings.

DETAILED DESCRIPTION OF PREFERRED EMBODIMENT AND THE BEST MODE FOR CARRYING OUT THE PRESENT INVENTION

Figure 1:
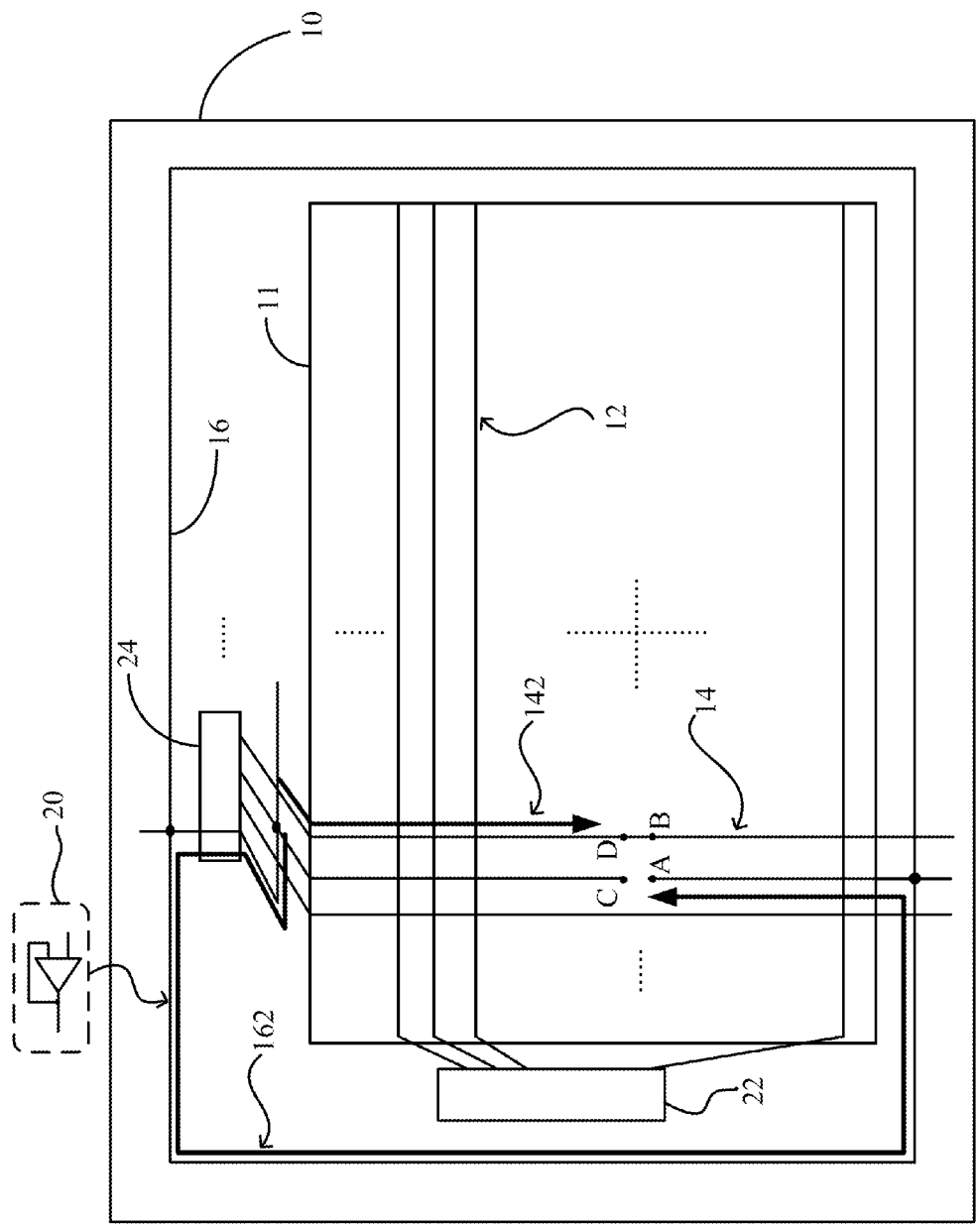
FIG. 1 is a schematic view showing a conventional way of rescuing a signal line of a liquid crystal display panel.
Figure 2A:
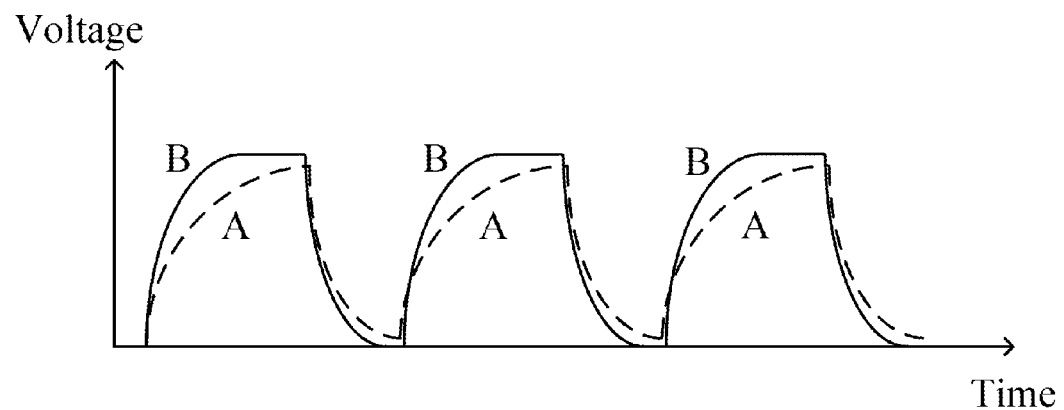
FIG. 2A is a plot of display signals at points A, B of FIG. 1, which are not subjected to correction.
Figure 2B:
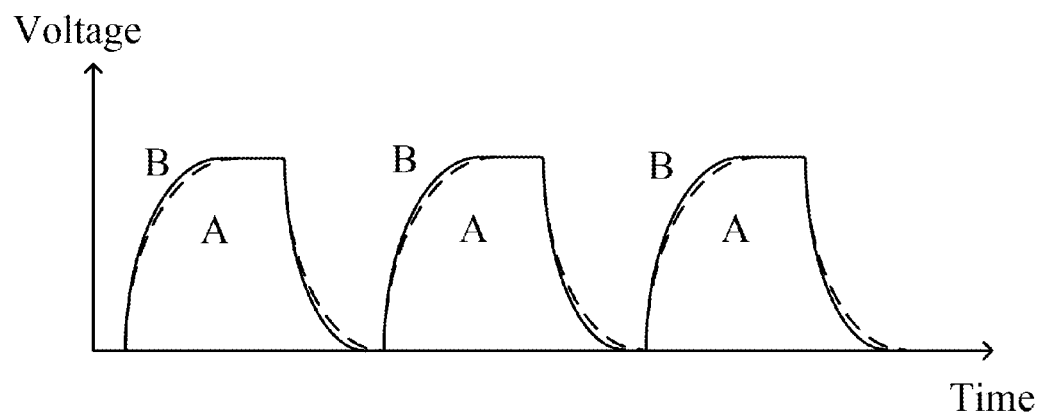
FIG. 2B is a plot of display signals at points A, B of FIG. 1 after correction.
Figure 3:
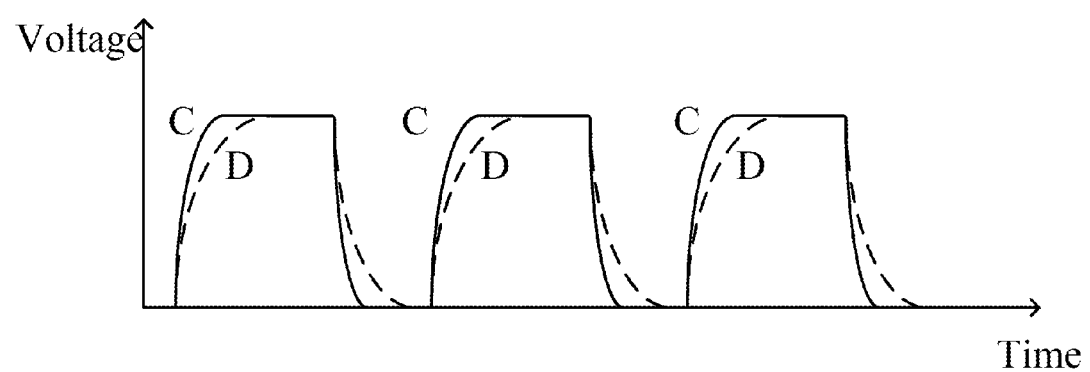
FIG. 3 is a plot of display signals at points C, D of FIG. 1.
Figure 4:
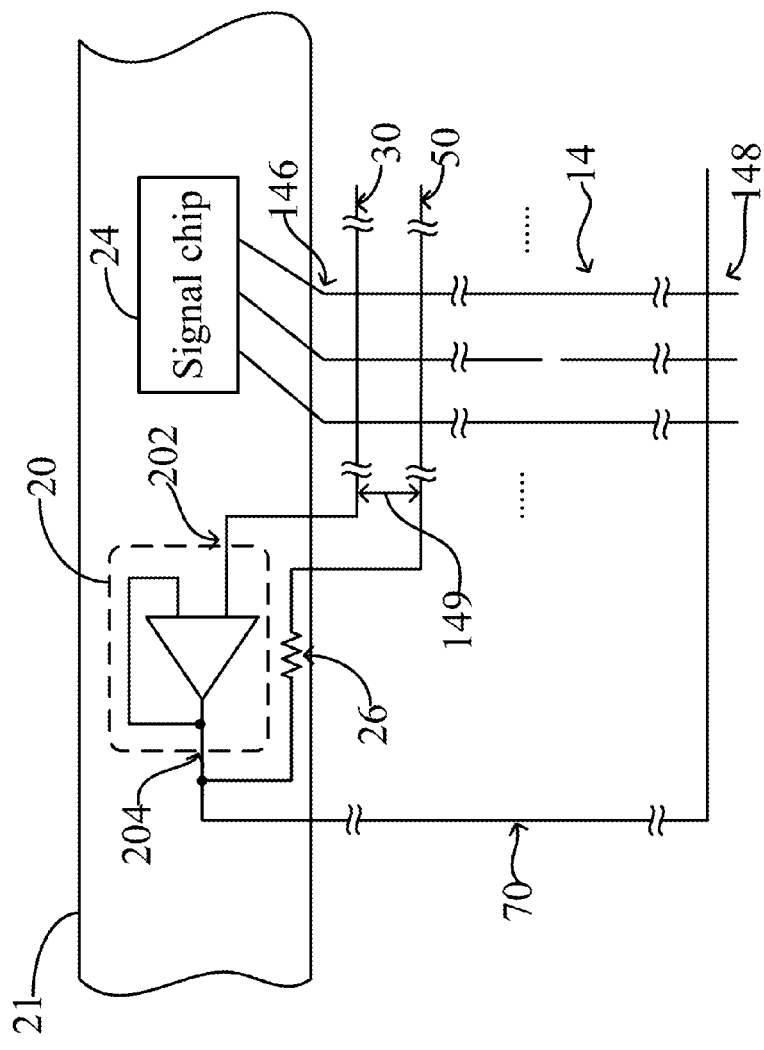
FIG. 4 is a schematic view illustrating a rescue circuit of display panel according to a preferred embodiment of the present invention.

Reference is now made to FIG. 4. FIG. 4 is a schematic view illustrating a rescue circuit of display panel according to a preferred embodiment of the present invention. In the preferred embodiment, the display panel comprises a substrate 10, and a plurality of scan lines (not shown) and a plurality of signal lines 14 are provided on the substrate 10 with the plurality of scan lines arranged to be parallel to each other and intersecting the plurality of signal lines 14. The scan lines and the signal lines 14 form a plurality of pixel areas therebetween, each being controlled by a thin film transistor (TFT) (not shown) for pixel refreshing.

Each of the signal lines 14 has a signal input terminal 146 and a signal distal end 148 for transmission of a display signal. Specifically, the substrate 10 comprises a plurality of signal chips 24 arranged thereon. For clear illustration, only one signal chip 24 is shown in the drawings. The signal chip 24 functions to provide the display signal for a pixel to the signal lines 14.

The rescue circuit comprises an amplifier 20, a first conductive line 30, a second conductive line 50, and a third conductive line 70. The amplifier 20 has an input end 202 and an output end 204 for transmission of the display signal. The amplifier 20 is preferably a buffer amplifier. The buffer amplifier features relatively high input impedance and relatively low output impedance, which help reducing the influence that loading imposes on signal source. Thus, a display signal can be transmitted through the buffer amplifier to the third conductive line with reduced RC delay. The amplifier 20 is preferably mounted on a printed circuit board (PCB) 21, or is alternatively mounted on a flexible printed circuit (FPC).

The first conductive line 30 is made intersecting but isolated from the signal input terminals 146 of the plurality of signal lines 14 and is electrically connected to the input end 202 of the amplifier 20. The second conductive line 50 is made intersecting but isolated from the signal input terminals 146 of the plurality of signal lines 14 and is electrically connected through an electrical resistor 26 to the output end 204. It is noted that between the first conductive lines 30 and the second conductive line 50 and the plurality of the signal lines 14, an isolation layer, such as silicon dioxide (not shown), is provided for isolating the first conductive line 30 and the second conductive line 50 from the plurality of signal lines 14 at the intersections (with the signal input terminals 146).

The third conductive line 70 is made intersecting but isolated from the signal distal ends 148 of the plurality of signal lines 14 and is electrically connected to the output end 204. Similarly, an isolation layer (not shown) is arranged between the third conductive line 70 and the plurality of signal lines 14 to isolate the third conductive line 70 from the plurality of signal lines 14 at the intersections (with the signal distal ends 148). Further, the second conductive line 50 is electrically connected to the third conductive line 70 at the output end 204. In the preferred embodiment, the first conductive line 30, the second conductive line 50, and the third conductive line 70 are made of the same metal material, which is preferably a high conductivity metal, such as copper, aluminum, sliver, and gold.

The first conductive line 30 and the second conductive line 50 are spaced from each other by a distance 149 for facilitating cutting off the plurality of signal lines 14. When one of the signal lines 14 is broken and thus open, because the second conductive line 50 comprises an electrical resistor 26 that deteriorates the display signal transmitted to the anterior portion of the open signal line 14 preceding the opening site, but the existing advantage of reduced RC delay in the posterior portion of the open signal line 14 following the opening site realized through the buffer amplifier is still kept, the problem of weak line discussed above is overcome. Details can be referred to the following description regarding a rescue method applied to the preferred embodiment of the rescue circuit.

Figure 5:
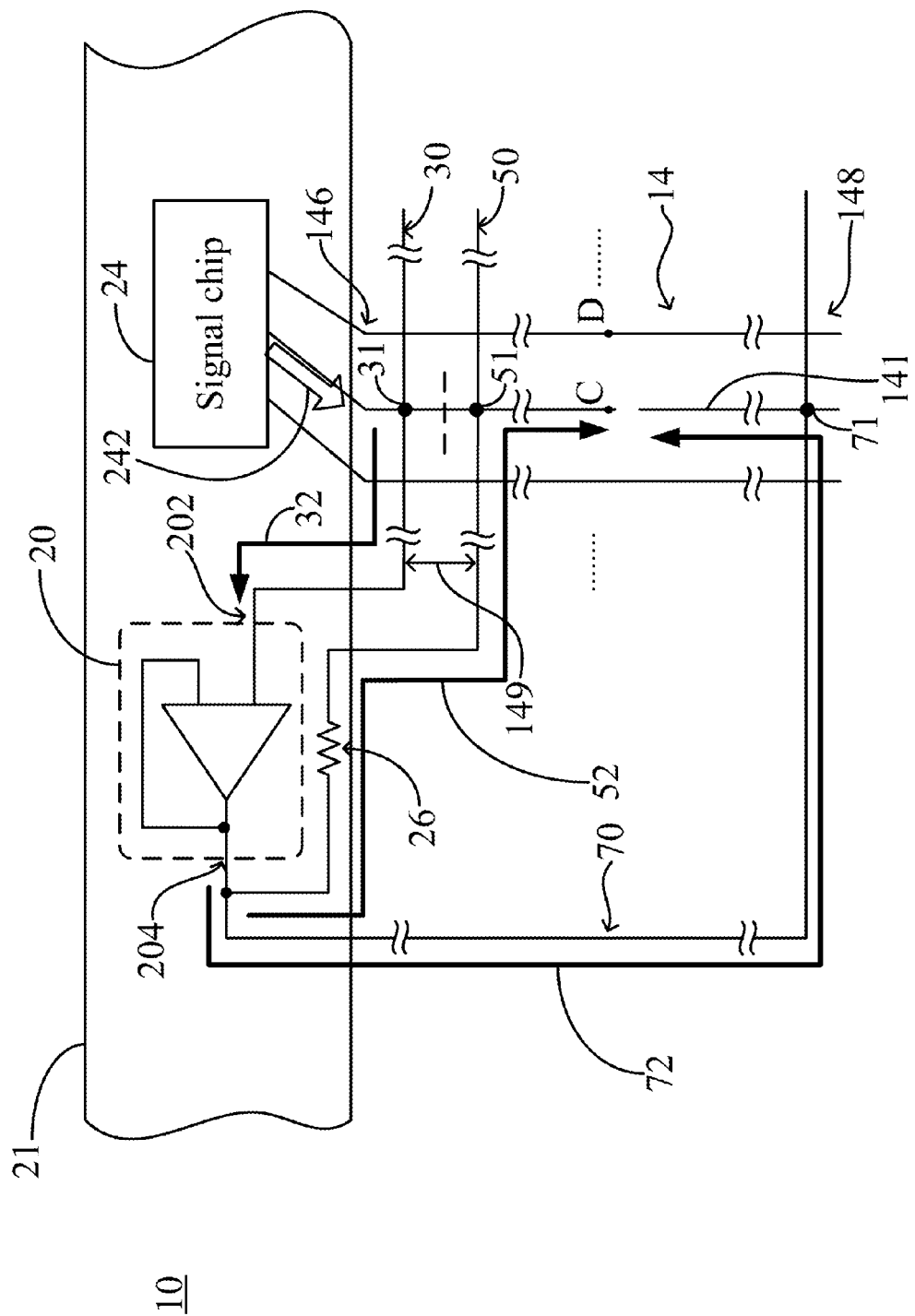
FIG. 5 is a schematic view illustrating rescue being made with the rescue circuit of FIG. 4.

Reference is made to FIG. 5. FIG. 5 is a schematic view illustrating rescue being made with the rescue circuit of FIG. 4. In the rescue method applied to a rescue circuit of display panel according to the preferred embodiment of the present invention, the display panel comprises a plurality of signal lines 14, and each of the signal lines 14 has a signal input terminal 146 and a signal distal end 148 for transmission of a display signal 242 provided from a signal chip 24. The rescue circuit comprises an amplifier 20, a first conductive line 30, a second conductive line 50, and a third conductive line 70. The amplifier 20 has an input end 202 and an output end 204 for transmission of the display signal 242. The first conductive line 30 intersects and is isolated from the signal input terminals 146 of the plurality of signal lines 14 and is electrically connected to the input end 202. The second conductive line 50 intersects and is isolated from the signal input terminals 146 of the plurality of signal lines 14 and is electrically connected through an electrical resistor 26 to the output end 204. The third conductive line 70 intersects and is isolated from the signal distal ends 148 of the plurality of signal lines 14 and is electrically connected to the output end 20.

The rescue method according to the present invention is used to rescue a broken and thus open signal line 14, which is specifically designated with a reference numeral 141. The rescue method comprises: performing a welding operation and performing a cutting operation. The welding operation is used to weld the broken signal line 141 to the first conductive line 30, the second conductive line 50, and the third conductive line 70 at corresponding intersections, which are respectively designated at 31, 51, 71. The welding operation is preferably performed with laser welding, which transmits through the isolation layer to make electrical connection of the broken signal line 141 to the first conductive line 30, the second conductive line 50, and the third conductive line 70 respectively at the intersections 31, 51, 71.

The cutting operation is used to cut off the connection of the broken signal line 141 between the intersections 31, 51 thereof with the first conductive line 30 and the second conductive line 50, the cut site being indicated by a phantom line shown in FIG. 5. As mentioned previously, the first conductive line 30 and the second conductive line 50 are spaced from each other by a distance 149, which provides a sufficient space between the first conductive line 30 and the second conductive line 50 for performance of the cutting operation. Similarly, the cutting operation is preferably performed with laser cutting.

With the rescue made above, a display signal 242 passing through the broken signal line 141 is transmitted from the first conductive line 30, via the intersection 31, to the amplifier 20, as indicated by route 32. The display signal 242, after being processed by the amplifier 20 (such as a buffer amplifier), is conducted through the electrical resistor 26 and the intersection 51 to the second conductive line 50 to get back to the anterior portion of the broken signal line 141, as indicated by route 52. Further, the display signal 242, after being processed by the amplifier 20, is also transmitted from the third conductive line 70, via the intersection 71, to the posterior portion of the broken signal line 141, as indicated by route 72.

Figure 6:
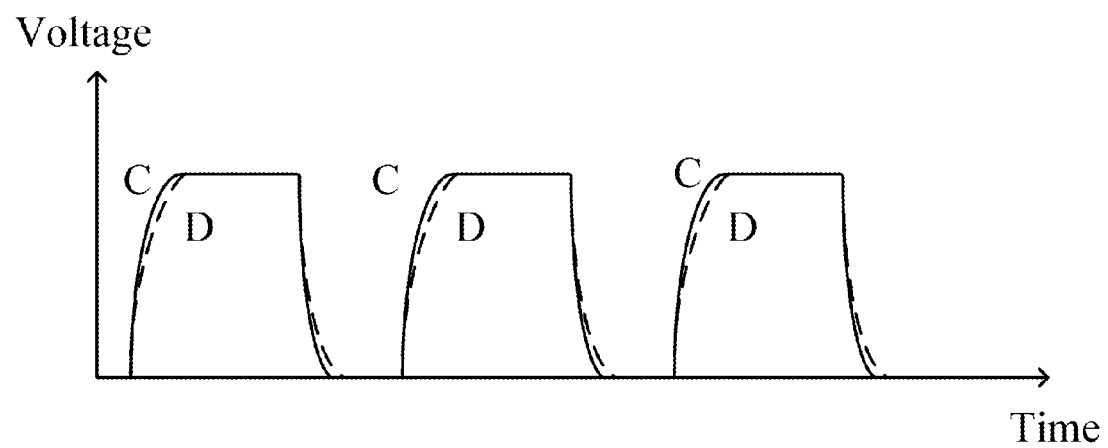
FIG. 6 is a plot of display signals at points C, D of FIG. 5.

Reference is made to FIG. 6. FIG. 6 is a plot of display signals at points C, D of FIG. 5, in which the display signals at points C, D are respectively shown in solid lines and phantom lines. After being processed by the amplifier 20, the display signal 242 is further processed by the electrical resistor 26 to increase RC delay, whereby the display signal at point C is made close to the display signal of the signal line 14 of point D. In this way, the problem of weak line for the anterior portion of a broken signal line 141 is overcome. Further, the display signal 242, after being processed by the amplifier 20, is sufficient to alleviate the problem of RC delay for the posterior portion of the broken signal line 141.

Although the present invention has been described with reference to the preferred embodiment thereof, it is understood that the description is not to limit the scope of the present invention. To those having ordinary skills in the art, various changes and modifications can be made to what described above without departing from the spirit and scope of the present invention, which is intended to be defined by the appended claims.

What is claimed is:

1. A rescue method for display panel by using a rescue circuit, the display panel comprising a plurality of signal lines, each of the signal lines having a signal input terminal and a signal distal end, the rescue circuit comprising an amplifier, which has an input end and an output end; a first conductive line, which intersects and is isolated from the signal input terminals of the plurality of signal lines and is electrically connected to the input end; a second conductive line, which intersects and is isolated from the signal input terminals of the plurality of signal lines and is electrically connected through an electrical resistor to the output end; and a third conductive line, which intersects and is isolated from the signal distal ends of the plurality of signal lines and is electrically connected to the output end, the rescue method comprising the following steps:

performing a welding operation to weld a broken one of the signal lines to the first conductive line, the second conductive line, and the third conductive line at corresponding intersections; and performing a cutting operation to cut off connection of the broken signal line between the intersections thereof with the first conductive line and the second conductive line.

2. The rescue method as claimed in claim 1, wherein the welding operation is performed with laser welding.

3. The rescue method as claimed in claim 1, wherein the cutting operation is performed with laser cutting.

\* \* \* \* \*